3,409,427
METHOD OF TREATING LATERITES
Georges Bonnivard, Metz, France, assignor to Institut de Recherches de la Siderurgie Francaise, St. Germain-en-Laye, Yvelines, and Bureau de Recherches Geologiques et Minieres, Paris, France
Filed Apr. 4, 1966, Ser. No. 539,781
Claims priority, application France, Apr. 6, 1965, 12,089
13 Claims. (Cl. 75—1)

ABSTRACT OF THE DISCLOSURE

A method of treating iron ore containing a small percentage of non-ferrous metals, such as chrome, nickel, cobalt and aluminum in which the ore is ground while sodium carbonate and also possibly, but not necessarily, calcium carbonate is mixed thereto and the mixture is humidified and formed into pellets. The pellets are subjected to a first roasting process in the presence of air to form from the chrome and aluminum contained therein chromates and salts of aluminum, which are leached out from the pellets by submerging the same into a liquid. Subsequently the pellets are subjected in the presence of sulfur dioxide to a second roasting process and the sulfates thus formed are leached out from the pellets whereafter the latter are dried.

---

The present invention relates to a method of treating laterites, that is iron ores which may contain a relative small percentage of chrome, nickel, cobalt and aluminum. More specifically, the present invention relates to a method which permits to separate the metals contained in the ore, that is the laterite, in such a manner to render the ore best suited for the production of iron while recovering the other metals of considerable value therefrom.

It is an object of the present invention to increase the surface of contact between the ore to be treated and a material permitting extraction of certain constituents from the ore.

It is a further object of the present invention to process the ore into a form having a high mechanical strength best suited for further processing the same in a blast furnace or similar metallurgical apparatus.

It is an additional object of the present invention to carry out the extraction of constituents different from iron from the ore in a single continuous cycle of operations.

With these objects in view, the method according to the present invention of treating iron ores, which may contain a small percentage of chrome, nickel, cobalt and aluminum, by roasting and lixivation comprises the steps of adding to the ore a percentage, for instance 12% to 20% per weight of sodium carbonate and possibly but not necessarily, also a smaller percentage, for instance up to 8% of calcium carbonate, grinding the aforementioned mixture of ore and carbonate, humidifying the mixture and forming therefrom small pellets of great mechanical strength, subjecting the pellets in the presence of air to a first roasting process to form from the chrome and aluminum contained in the ore chromates and salts of aluminum, this first roasting process may be carried out at a temperature between 900° and 1200° C., immersing the pellets, after the same have been cooled, in a liquid of about room temperature to dissolve the chromates and the salts of aluminum formed during the first roasting process, applying a vacuum above the level of the liquid to enhance penetration of the liquid into the pores of the pellet and thereby leaching of said chromates and salts of aluminum from the remainder of the pellets, subjecting the liquid to atmospheric pressure, separating the liquid and the constituents dissolved therein from the pellets, subjecting the pellets in the presence of sulfur dioxide to a second roasting process at a temperature of about 650° to 820° C., reimmersing the pellets, after the same have been cooled again, in a liquid to dissolve the sulfates formed during the second roasting process, applying a vacuum above the level of the liquid to enhance penetration of the liquid into the pores of the pellets, re-establishing atmospheric pressure above the liquid, separating the liquid and the sulfates dissolved therein from the pellets and finally drying the pellets.

According to the present invention the iron ore containing a small percentage of other metals such as chrome, nickel, cobalt and aluminum is brought into a form best suited for the following treatment and having a high mechanical resistance against crushing so that after the various steps according to the present method have been carried out and after the non-ferrous metals have been separated from the iron ore, the latter is in a form best suitable for further treatment of the ore in a blast furnace or the like.

Experience has shown that pellets of substantially spherical configuration are most suitable for carrying out the process according to the present invention, because such pellets will present for a given volume a maximum surface of contact. On the other hand, the roasting process to which the pellets are subjected according to the present invention and which comprises mainly a dehydration and decarburization of the pellets render the latter porous, since during the roasting process molecules of water and $CO_2$ depart from the pellets and increase therefore the internal contact surface. This porosity of the pellets, which during a leaching process as heretofore carried out has proved a disadvantage since the leaching liquid could not penetrate into the air filled pores, permits due to the process according to the present invention an increased and expedited extraction of the chromates, salts of aluminum and sulfates formed during the roasting process. By creating a vacuum above the liquid in which the pellets are immersed, air contained in the pores is sucked out therefrom and replaced by the leaching liquid. This novel process according to the present invention permits a more complete extraction of the non-ferrous metals from the pellets and at a time which is about only $\frac{1}{25}$ of the time necessary according to leaching processes according to the prior art.

Another advantage according to the present invention consists in the fact that the pellets do not undergo any disintegration during the various treatments they are subjected to so that the pellets which will maintain their form may be placed in a blast furnace or different metallurgical apparatus for transforming the pellets into iron. In fact, it has been established that pellets with a diameter of about 10 mm. will maintain at the end of the various leaching and roasting steps a mechanical resistance against crushing of about 10 kg.

As mentioned before, the pellets according to the present invention are formed from a mixture of ore and sodium carbonate and calcium carbonate, the latter added in a small percentage replaces the sodium carbonate added for the extraction of the chrome from the ore in form of a chromate. The lime thus added has the advantage that it is not extracted during the leaching process so that the final product obtained is a self fluxing ore best suited for the blast furnace or different metallurgical apparatus to which the ore pellets are transferred for further processing. Furthermore, the lime added improves considerably the mechanical strength of the pellets during the above-mentioned process steps.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
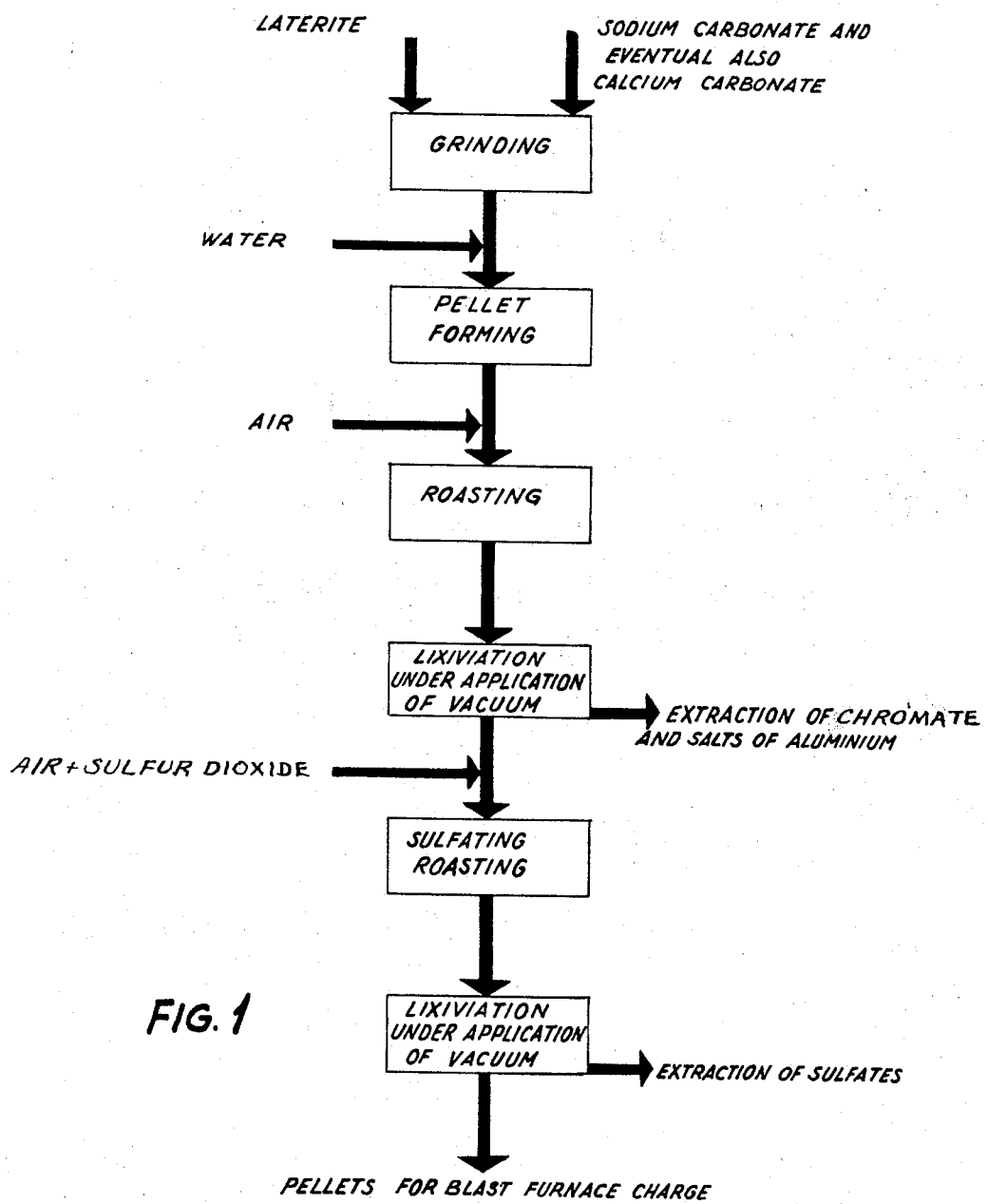
FIG. 1 is a schematic flow diagram of the method according to the present invention.

FIG. 1 schematically illustrates a flow diagram for carrying out the method of the present invention.

By the method as shortly described above especially laterites from the province of Conakry (France) have been treated which in dry state have the following composition: FE=56%, CR=0.88%, Ni=0.35%, Co=0.04%, $Al_2O_3$=3%, $SiO_2$=2.1%, and ignition loss=12%.

This ore in humid state is ground in an appropriate grinder to particles below 200 microns of diameter whereby during the grinding process 16% by weight sodium carbonate in pulverulent form is added to obtain a homogeneous mixture of a grain size less than 200 microns. The pulverulent mixture is formed into pellets in a manner known per se on a rotating disc while spraying finely divided water onto the moving mass thereby after a few minutes of rotation of the disc individual pellets of a diameter between 8 to 12 mm. are obtained. The pellets are then rapidly dried at a temperature of about 150° C., and in this way a batch of dry pellets containing 15% of sodium carbonate and 85% of dry ore is obtained.

The pellets are subsequently thereto roasted in a rotating furnace in which the pellets are gradually heated up to a temperature of about 1000° C., which temperature is obtained at the end of 2 hours, and subsequently thereto the roasting process is continued for about 3 hours while the above-mentioned maximum temperature is maintained. The heating of the pellets is obtained by the combustion of fuel oil in the presence of excess air. The pellets are afterwards rapidly cooled in air and they will now have a black color and are slightly magnetic. The chemical analysis of the pellets at the end of the aforementioned process steps is the following: Fe=56%, Cr=0.9%, Ni=0.35%, Co=0.05%, $Al_2O_3$=3%, $SiO_2$=2.1%, $Na_2O$=11%.

The pellets are then placed in a container and immersed in a $\frac{1}{10}$ normal solution of sodium carbonate at about room temperature. Subsequently thereto a vacuum is applied above the level of liquid to maintain a pressure of 75 mm. Hg above the liquid and during this process step a discharge of gas from the pellets can be observed. Subsequently thereto atmospheric pressure is reestablished above the level of liquid in the container and it can be noticed that now the liquid level in the container is considerably below the original liquid level. The volume of the liquid between the original liquid level and the new liquid level represents exactly the volume of air which has been driven out from the pellets during the above-mentioned discharge of air therefrom and the spaces in the pellets which have originally been filled with air are now occupied by the liquid which has penetrated through the pores into the pellets. This degassing is completed after the vacuum has been applied the first time.

The solution containing the chromates and salts of aluminum is then discharged from the container. Subsequently thereto a new $\frac{1}{10}$ normal solution of sodium carbonate is introduced into the container, a vacuum is again applied above the level of liquid, and the new filtrate is again discharged from the container after atmospheric pressure has been reestablished therein. After the aforementioned steps have been repeated four times substantially the total amount of chrome and aluminum originally contained in the ore and transformed during the roasting into chromates and aluminum salts has been dissolved and the repeated application of the vacuum is made in order to assure diffusion of liquid into the interior of the pellets.

The pellets obtained after the last leaching step contain about 30% of liquid. The chemical analysis of the pellets in dry state is now as follows: Fe=58%, $SiO_2$=2.2%, $Al_2O_3$=2%, Cr=0.15%, Ni=0.35%, $Na_2O$=9%, Co about 0.05%.

In the solution 84% of the original Cr, 38% of the original aluminum, and 20% of the introduced $Na_2O$ has been recovered, but the solution does not contain any iron, nickel, or cobalt.

The alkaline roasting process does not permit to dissolve the nickel contained in the ore which however is convenient to extract.

On the other hand, the maintenance of the residual $Na_2O$ in the pellets is much too great for an iron ore destined for further processing in a blast furnace. The subsequently carried out sulfating roasting process corresponds to an acid treatment by a mixture of air and $SO_2$. This subsequent roasting process is carried out at a temperature of about 700° C. which permits to form sulfates from the soda and nickel contained in the ore whereas at this temperature formation of iron sulfates is practically negligible due to the instability of the corresponding sulfates. According to calculations carried out by the inventor the nickel sulfate remains stable up to a temperature of 820° C. in an atmosphere containing 90% of air and 10% of sulfur dioxide. The sulfating roasting process is carried out under the following conditions. The temperature is gradually increased during one hour up to about 700° C. and this temperature is maintained constant for three hours, after which the temperature is raised to about 750° C., and maintained constant at this temperature during a further hour, and during the whole time of this roasting the pellets are maintained in a gaseous atmosphere containing 90% air and 10% $SO_2$. After the pellets are cooled again they have a reddish color and are not magnetic and during this roasting process they maintain their pellet form and do not disintegrate. The chemical analysis after this second roasting process is as follows: Fe=54%, $SiO_2$=2.05%, $Al_2O_3$=1.8%, Cr=0.11%, Ni+Co=0.38%, $SO_3$=8%, $Na_2O$=8%.

The sulfates formed during said second roasting process are easily soluble in water. The leaching steps of the roasted pellets are the same as described above with the exception that as a leaching solution water acidified with a sulfuric acid to a pH of 1.5 is used to avoid hydrolysis of the iron sulfate. After repeating four times the steps of leaching the pellets under application of a vacuum, the pellets will have in dry state the following chemical composition: Fe=67.5%, $SiO_2$=2.45%, $Al_2O_3$=0.9%, Ni+Co=0.09%, Cr=0.15%, S=0.15%, $Na_2O$=0.1%.

The pellets thus obtained have reddish brown color and are composed of nearly pure iron oxide, $Fe_2O_3$, and constitute an excellent basic material for the blast furnace. The resistance of the pellets against crushing is still in the neighborhood of 10 kg. The solution discharged contains the following percentage of the materials contained in the pellets after the second roasting process: Ni+Co=80%, $Al_2O_3$=58%, $Na_2O$=99%, S=96%, Fe=1.4%, Cr=20%.

In this way 87% of the chrome content, 80% of the nickel and cobalt content, 75% of the aluminum content, 1% of the silicon content originally contained in the pellets has been extracted, whereas due to this sulfating 1.4% of the iron contained in the original pellets have been extracted, which amount is practically negligible.

Laterites from another layer of the ore bed of Conakry have been treated with the above-described method which laterites have in dry state the following chemical analysis: $Fe=53.5\%$, $SiO_2=1\%$, $Al_2O_3=8.9\%$, $Ni+Co=0.11\%$, $Cr=0.9\%$, and the ignition loss 12%.

In this case, however, the ore has been ground with an addition of 13% in weight of sodium carbonate and an additional percentage of 6% by weight of calcium carbonate. The analysis of the final concentrate obtained from the ore after the same has been subjected to the above described method steps is as follows: $Fe=61.5\%$, $Cr=0.10\%$, $Al_2O_3=3.4\%$, $SiO_2=1.15\%$, $Ni+Co=0.12\%$, $CaO=3.7\%$, $Na_2O=2\%$.

The introduction of lime before the roasting and the presence of residual sodium carbonate will provide the concentration with a basicity value $$i=\frac{CaO+Na_2O}{SiO_2+Al_2O_3}=1.25$$

which render the pellets self-fluxing.

In this case the pellets have not been subjected to a sulfating roasting process since the content of nickel and cobalt is sufficiently small so as not to be troublesome during reduction of the pellets in a blast furnace. The following percentages of the original amounts contained in the pellets have been extracted: $Cr=89\%$, $Al_2O_3=67\%$, $Na_2O=70\%$.

Figures 2, 3:
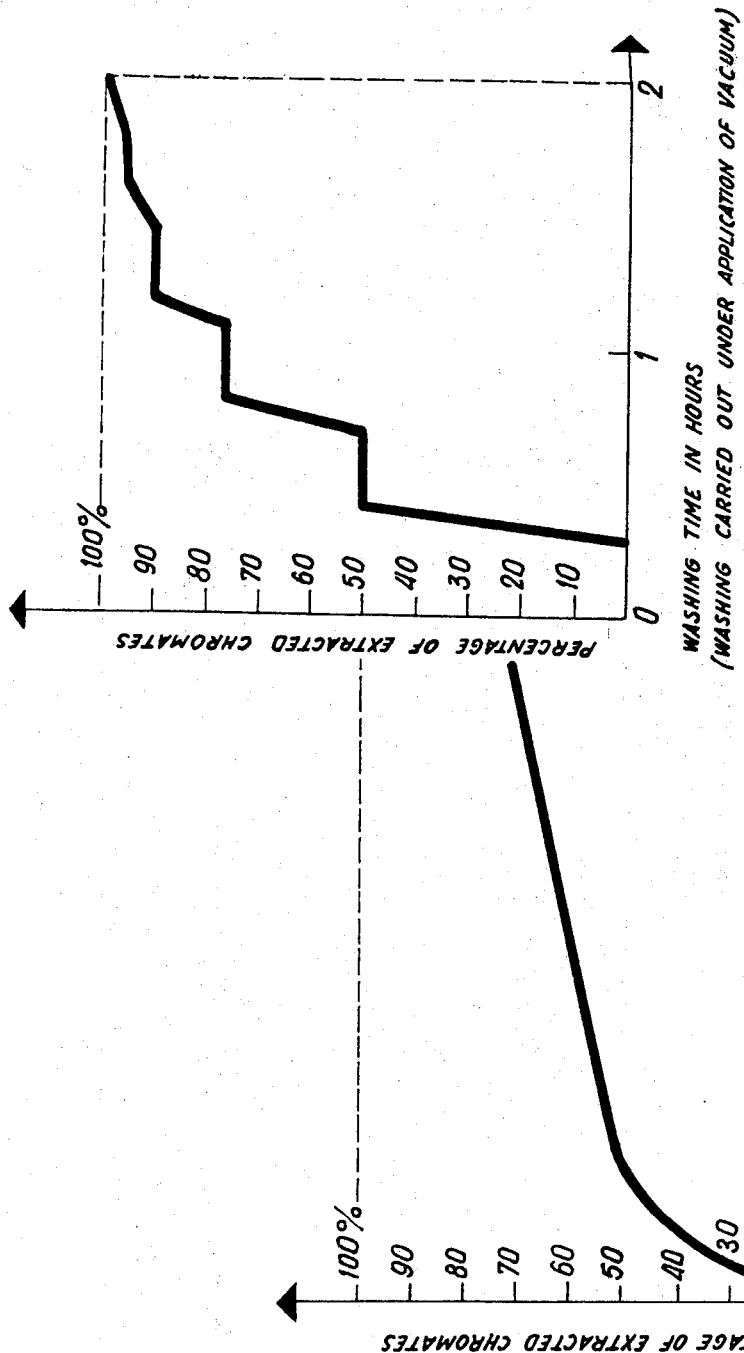
FIG. 2 is a graph illustrating extraction of chromates from pellets during a leaching process according to the prior art.
FIG. 3 is a graph illustrating the extraction of chromates from iron ore pellets according to the present invention.

FIG. 2 represents a graph illustrating the extraction of chromates from pellets by simple leaching under atmospheric pressure and room temperature. The abscissa of the graph denotes the hours of leaching time, and the ordinate denotes the total extraction of chromate of sodium formed during the alkaline roasting. As can be noted from the graph of FIG. 2 about 70% of the chromates formed are extracted during a leaching time of 48 hours.

FIG. 3 represents a graph illustrating the chromate extraction according to the method of the present invention. As is evident from the graph of FIG. 3, 100% of the chromate formed during the alkaline roasting is extracted in 2 hours after a vacuum above the level of the leaching liquid has been applied 4 times as indicated in the graph by the various horizontal portions thereof. The method of leaching under simultaneous application of a vacuum constitutes therefore an extraordinary and surprising progress with regard to a leaching process heretofore used. In fact, with the method of the present invention one can extract 100% of the chromate contained in the ore as compared with only 70% according to the known method and in a time which is about only ½₄ of the time necessary according to the method heretofore used.

Figure 4:
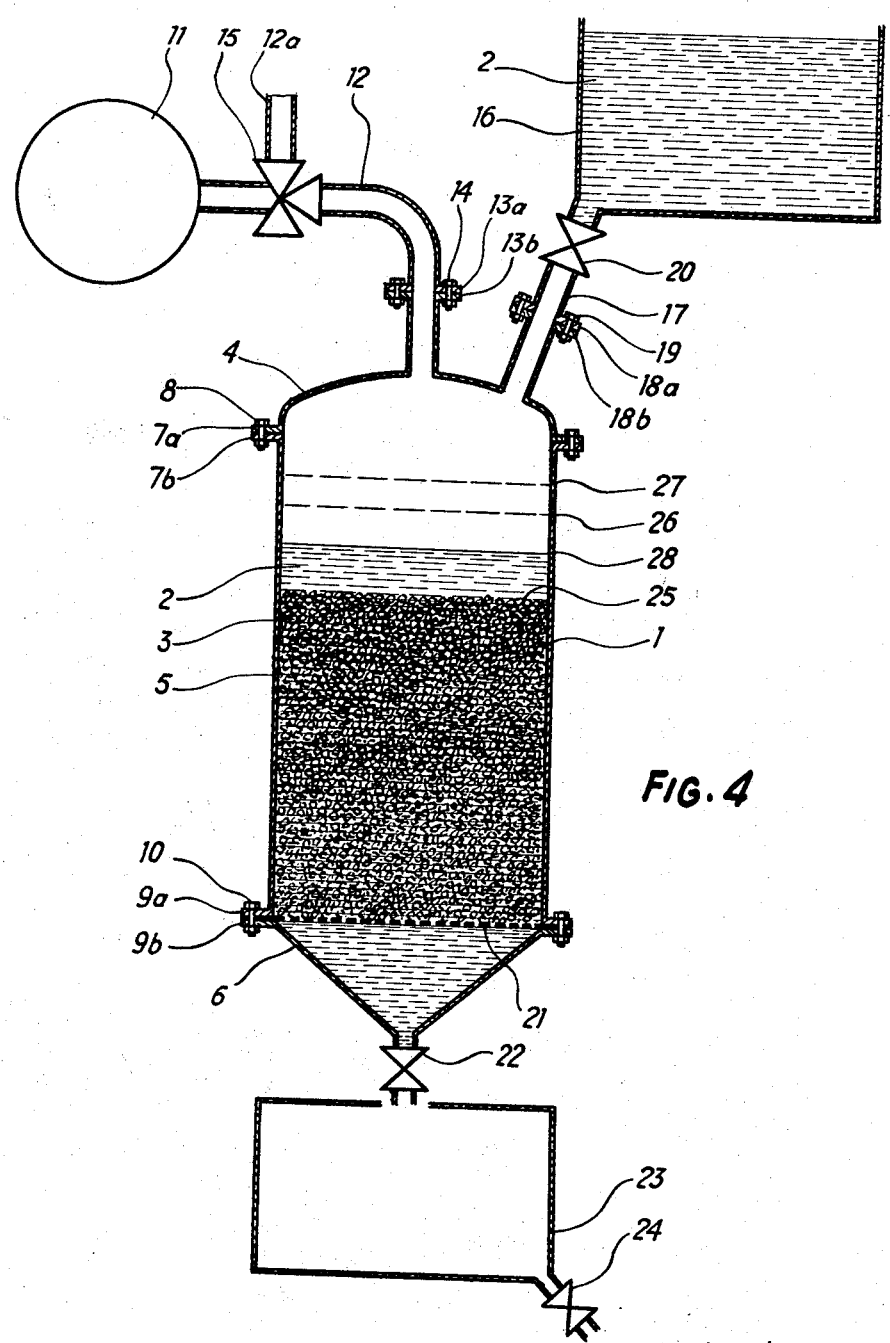
FIG. 4 is a schematic side view illustrating an apparatus for the extraction of chromates, salts of aluminum and sulfates by lixiviation or leaching under vacuum according to the present invention.

FIG. 4 schematically illustrates an embodiment of an apparatus for carrying out the above-mentioned steps of extracting the chromates, salts of aluminum and sulfates from the pellets by leaching under vacuum. As can be seen from FIG. 4, the apparatus comprises a container 1 having a cylindrical body portion 5, a dome-shaped cover 4 joined to the upper end of the body portion by means of two flanges 7a and 7b and a plurality of screws 8 extending through the flanges, and a substantially conical bottom portion likewise joined to the body 5 by means of two flanges 9a and 9b and screws 10 extending through the flanges. The container 1 is connected to a vacuum pump 11 by means of a conduit 12 which can be disconnected from the cover 4 by means of cooperating flanges 13a and 13b and a plurality of screws 14 extending through the flanges. A three-way valve 15 is located in the conduit 12 which permits to connect the interior of the container 1 to the vacuum pump 11 in one position of the valve 15, to close the conduit 12, or to connect the interior of the container 1 to the outer atmosphere by means of a branch conduit 12a communicating at one end with the valve 15 and at the other end thereof with the outer atmosphere. The container 1 is further connected to another container 16 by means of a conduit 17 which is likewise disconnectable from the container 1 by means of the flanges 18a and 18b connected to each other by screws 19. A valve 20 is located in the conduit 17 to control flow liquid 2 from the container 16 through the conduit 17 into the container 1. The liquid 2 in the container 16 serves, when fed into the container 1 to provide for a leaching action on the pellet 3 located in the container 1. The liquid is fed into the container 16 by means not shown in the drawing. A grid 21 extending transversely through the bottom of the cylindrical portion of the container 1 serves to retain the pellets 3 therein. A valve 22 at the extremity of the conical bottom portion 6 of the container 1 permits to discharge the solution containing the metal salts leached out of the pellets into a receptacle 23 located beneath the bottom of the container 1 and the solution may be discharged from the receptacle 23 by means of a valve 24 located at the bottom portion thereof.

The apparatus above described is used as follows:

After the cover 4 is removed the container 1 is filled with ore pellets 3 up to a predetermined level 25. Subsequently thereto, the cover 4 is connected to the cylindrical portion 5 of the container by means of screws 8 and the conduits 12 and 17 are likewise connected to the cover. The valve 22 is then closed and the valve 20 opened so that liquid 2 in the container 16 flows into the container 1 and the valve 20 is closed after the liquid in the container 1 reaches the level 26 indicated in dash lines in FIG. 4, which in considerably above the level 25 of the pellets. During feed of liquid into the container 1, the interior of the latter is kept in communication with the atmosphere through the conduit 12, the valve 15 and the branch conduit 12a. After the liquid has reached the level 26, the valve 15 is turned to place the interior of the container 1 in communication with the vacuum pump 11. The vacuum pump is started and air is evacuated from the interior of the container until an under-pressure of 75 mm. Hg is maintained therein. During this evacuation of air from the interior of the container a degassing action of the pellets 3 takes place and gas bubbles rising violently through the liquid 2 raise the liquid level up to about the dash line 27 shown in FIG. 4. After the degassing action has been completed, the interior of the container 1 is placed by means of the valve 15 in communication with the outer atmosphere, whereupon the level of the liquid in the container 1 drops below the original liquid level 26 to the liquid level 28 shown in full lines in FIG. 4. The volume of the liquid between the original liquid level 26 and the final liquid level 28 is the amount of liquid which due to the degassing action has penetrated through the pores in the pellets into the latter. Afterwards the valve 22 is opened and the liquid, in which the metal salts leached out from the pellets are dissolved, is discharged from the container 1 into the receptacle 23. The above-described steps of leaching the pellets 3 in the container 1 under application of the vacuum is repeated 4 times and afterwards the cylindrical portion 5 of the container is disconnected from the cover 4 and the bottom portion 6, the leached-out pellets are discharged in any convenient manner and afterwards dried in the air, while a second cylindrical portion 5 filled with new pellets is placed in the apparatus whereupon the aforementioned cycles are again repeated.

It will be understood that each of the elements described above, or two or more together, may also find a useful application in other types of a process of treating laterites differing from the types described above.

While the invention has been illustrated and described as embodied in a process of treating laterites including the steps of leaching pellets formed from the laterite ore under application of a vacuum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of treating iron ore containing a small percentage of non-ferrous metals, such as chrome, nickel, cobalt and aluminum, comprising the steps of grinding said ore, while mixing sodium carbonate thereto; humidifying said mixture and forming therefrom pellets of great mechanical strength; subjecting said pellets in the presence of air to a roasting process to form from the chrome and aluminum contained in the ore chromates and salts of aluminum while rendering the pellets porous; cooling said pellets; submerging said cooled pellets in a liquid to dissolve said chromates and salts of aluminum; applying a vacuum above the level of said liquid to enhance penetration of said liquid into the pores of said porous pellets and thereby leaching said chromates and salts of aluminum from the remainder of said pellets; subjecting said liquid to atmospheric pressure; separating said liquid and the constituents dissolved therein from said pellets; subjecting said pellets in the presence of sulfur dioxide to a second roasting process; submerging said pellets after being cooled in a liquid to dissolve the sulfates formed during the second roasting process; applying a vacuum above the level of said liquid to enhance penetration of said liquid into the pores of said pellets and thereby leaching said sulfates from the remainder of said pellets; subjecting the liquid to atmospheric pressure; separating said liquid and the sulfates dissolved therein from said pellets; and drying said pellets.

2. A method as defined in claim 1, wherein also calcium carbonate is mixed in addition to said sodium carbonate to said ore.

3. A method as set forth in claim 2, wherein said mixture contains 12–20% per weight of sodium carbonate and up to 8% per weight of calcium carbonate.

4. A method as set forth in claim 1, wherein the vacuum applied above the level of the liquid is in the order of 75 mm. Hg.

5. A method as set forth in claim 1, wherein said first roasting process is carried out at a maximum temperature between 900 and 1200° C. and said second roasting process is carried out at a maximum temperature between 650 and 820° C.

6. A method as set forth in claim 5, wherein said first roasting process is carried out by gradually raising the temperature of the pellets to said maximum temperature during a period of two hours and maintaining said maximum temperature during further three hours, and wherein said pellets are subsequently cooled in air.

7. A method as set forth in claim 1, wherein after said first roasting process said steps of submerging the cooled pellets in a liquid, applying vacuum above the level of the liquid, subjecting the liquid to atmospheric pressure, and separating the liquid containing the dissolved salts from said pellets are repeated several times.

8. A method as set forth in claim 1, wherein the liquid in which the pellets are immersed after said first roasting process is a one-tenth normal solution of sodium carbonate.

9. A method as set forth in claim 2, wherein said second roasting process is carried out by raising the temperature of said pellets in one hour to a temperature of about 700° C.; continuing roasting of said pellets at said temperature during three hours; and heating said pellets to a further temperature of about 750° C. during the time of one hour; and subsequently cooling said pellets in air.

10. A method as set forth in claim 2, wherein said second roasting process is carried out in an atmosphere containing 10% per volume of sulfur dioxide and 90% per volume of air.

11. A method as set forth in claim 1, wherein after said second roasting process said steps of submerging the cooled pellets in liquid, applying vacuum above the level of the liquid, subjecting the liquid to atmospheric pressure, and separating the liquid containing the dissolved sulfates from the pellets are repeated several times.

12. A method as set forth in claim 11, wherein the liquid in which the pellets are immersed after the second roasting process is a solution having a pH of 1.5.

13. A method of extracting non-ferrous constituents comprising nickel, cobalt, chromates and salts of aluminum from porous pellets of iron ore containing said constituents, said method comprising the steps of submerging said pellets in a liquid in which said chromates and salts of aluminum are soluble; applying a vacuum above said liquid to enhance penetration of liquid into the pores of said porous pellets and to enhance thereby leaching of said chromates and salts of aluminum from the remainder of said pellets; reestablishing atmospheric pressure above said liquid; separating said liquid in which said chromates and salts of aluminum have been dissolved from said pellets; subjecting said pellets to a roasting process in the presence of sulfur dioxide; submerging said roasted pellets in a liquid in which the sulfates formed during said roasting process are soluble; applying a vacuum above said liquid to enhance penetration of said liquid into the pores of said porous pellets and thereby leaching said sulfates out of said pellets; re-establishing atmospheric pressure above said liquid; and separating said liquid in which said sulfates have been dissolved from said pellets.

References Cited

UNITED STATES PATENTS

| | | | |
|---|---|---|---|
| 1,575,852 | 3/1926 | McCormack | 75—1 |
| 2,762,703 | 9/1956 | Mancke | 75—101 |
| 2,809,105 | 10/1957 | Mancke et al. | 75—101 |
| 3,240,562 | 3/1966 | Brown et al. | 75—101 |

FOREIGN PATENTS

| | | |
|---|---|---|
| 755,112 | 8/1956 | Great Britain. |

L. DEWAYNE RUTLEDGE, *Primary Examiner.*

ERNEST L. WEISE, *Assistant Examiner.*